United States Patent
Marder-Eppstein et al.

(10) Patent No.: US 12,048,276 B2
(45) Date of Patent: Jul. 30, 2024

(54) GROWSPACE AUTOMATION

(71) Applicant: Hippo Harvest Inc., San Francisco, CA (US)

(72) Inventors: Eitan Marder-Eppstein, San Francisco, CA (US); Wim Meeussen, Redwood City, CA (US); Alexander Boenig, San Mateo, CA (US)

(73) Assignee: Hippo Harvest Inc., San Francisco, CA (US)

( * ) Notice: Subject to any disclaimer, the term of this patent is extended or adjusted under 35 U.S.C. 154(b) by 656 days.

(21) Appl. No.: 17/182,213

(22) Filed: Feb. 22, 2021

(65) Prior Publication Data

US 2021/0259170 A1    Aug. 26, 2021

Related U.S. Application Data

(60) Provisional application No. 62/979,364, filed on Feb. 20, 2020.

(51) Int. Cl.
*G05D 1/00* (2024.01)
*A01G 7/02* (2006.01)
(Continued)

(52) U.S. Cl.
CPC .............. *A01G 31/02* (2013.01); *A01G 7/02* (2013.01); *A01G 7/045* (2013.01); *A01G 9/0299* (2018.02);
(Continued)

(58) Field of Classification Search
CPC .......... A01G 31/02; A01G 7/02; A01G 7/045; A01G 9/0299; A01G 9/247; A01G 9/26; A01G 25/09; A01G 25/16; A01G 27/00; A01G 27/001; A01G 27/003; A01G 27/008; A01G 9/24; A01G 9/143; A01M 7/0089; A01M 7/0025; B25J 11/00; B60P 3/30; G05B 19/042; G05B 2219/23133; G05B 19/0426; G05B 2219/2625; G05D 1/0214;
(Continued)

(56) References Cited

U.S. PATENT DOCUMENTS

2011/0301757 A1 * 12/2011 Jones ...................... B60L 50/66
 700/258
2017/0339846 A1 * 11/2017 Lawrence .............. A01G 9/143
(Continued)

FOREIGN PATENT DOCUMENTS

CN   108496654 A   9/2018
CN   110679340 A   1/2020
(Continued)

OTHER PUBLICATIONS

U.S. Appl. No. 17/182,222, Non-Final Office Action dated May 10, 2021, 8 pgs.
(Continued)

*Primary Examiner* — Abby Y Lin
*Assistant Examiner* — Dylan M Katz

(57) ABSTRACT

A growspace automation system and method. The system includes a grow space with localization structures and a mobile robot. The mobile robot comprises sensors, a mobility mechanism, and a plurality of mobility modules. The mobile robot is configured to automate growspace processes, such as transport, watering, sensing, or cleaning.

20 Claims, 13 Drawing Sheets

(51) Int. Cl.
  *A01G 7/04* (2006.01)
  *A01G 9/029* (2018.01)
  *A01G 9/24* (2006.01)
  *A01G 9/26* (2006.01)
  *A01G 25/09* (2006.01)
  *A01G 25/16* (2006.01)
  *A01G 27/00* (2006.01)
  *A01G 31/02* (2006.01)
  *A01M 7/00* (2006.01)
  *B25J 11/00* (2006.01)
  *B60P 3/30* (2006.01)
  *G05B 19/042* (2006.01)
  *G06F 16/25* (2019.01)
  *G06Q 10/0631* (2023.01)
  *G06Q 50/02* (2024.01)

(52) U.S. Cl.
  CPC ............... *A01G 9/247* (2013.01); *A01G 9/26* (2013.01); *A01G 25/09* (2013.01); *A01G 25/16* (2013.01); *A01G 27/00* (2013.01); *A01G 27/001* (2013.01); *A01G 27/003* (2013.01); *A01G 27/008* (2013.01); *A01M 7/0089* (2013.01); *B25J 11/00* (2013.01); *B60P 3/30* (2013.01); *G05B 19/042* (2013.01); *G05D 1/0214* (2013.01); *G06F 16/25* (2019.01); *G06Q 10/06315* (2013.01); *G06Q 50/02* (2013.01); *A01G 9/24* (2013.01); *A01M 7/0025* (2013.01); *G05B 2219/23133* (2013.01)

(58) Field of Classification Search
  CPC ............ G05D 2201/0201; G06F 16/25; G06Q 10/06315; G06Q 50/02; Y02A 40/22; Y02P 60/21
  See application file for complete search history.

(56) References Cited

U.S. PATENT DOCUMENTS

| | | |
|---|---|---|
| 2018/0365137 A1 | 12/2018 | Millar |
| 2018/0368344 A1 | 12/2018 | Marshall |
| 2019/0259108 A1* | 8/2019 | Bongartz ............... A01G 31/02 |
| 2019/0261566 A1* | 8/2019 | Robertson ........... G06F 18/2148 |
| 2019/0281778 A1 | 9/2019 | Hawley-Weld et al. |
| 2020/0333782 A1* | 10/2020 | Kent .................... G05D 1/0278 |
| 2020/0352113 A1* | 11/2020 | Canipe .................. A01G 9/247 |
| 2021/0127594 A1* | 5/2021 | Millar .................... A01G 9/249 |
| 2021/0185942 A1* | 6/2021 | Sibley .................. G05D 1/0219 |

FOREIGN PATENT DOCUMENTS

| | | |
|---|---|---|
| EP | 3476211 A2 | 5/2019 |
| WO | 2019074549 A1 | 4/2019 |
| WO | 2019222860 A1 | 11/2019 |

OTHER PUBLICATIONS

U.S. Appl. No. 17/182,222, Examiner Interview Summary dated Jun. 24, 2021, 2 pgs.
Int'l Application Serial No. PCT/US21/19130, Int'l Search Report and Written Opinion dated Jun. 9, 2021.

* cited by examiner

GROWSPACE AUTOMATION

CROSS-REFERENCE TO RELATED APPLICATIONS

This application claims priority to Provisional U.S. Patent Application No. 62/979,364, titled "Growspace Operating System," filed on Feb. 20, 2020, by Eitan Marder-Eppstein et al., which is incorporated herein by reference in its entirety and for all purposes.

TECHNICAL FIELD

The present disclosure relates generally to agriculture, and more specifically to hydroponic farming systems.

DESCRIPTION OF RELATED ART

Agriculture has been a staple for mankind, dating back to as early as 10,000 B.C. Through the centuries, farming has slowly but steadily evolved to become more efficient. Traditionally, farming occurred outdoors in soil. However, such traditional farming required vast amounts of space and results were often heavily dependent upon weather. With the introduction of greenhouses, crops became somewhat shielded from the outside elements, but crops grown in the ground still required a vast amount of space. In addition, ground farming required farmers to traverse the vast amount of space in order to provide care to all the crops. Further, when growing in soil, a farmer needs to be very experienced to know exactly how much water to feed the plant. Too much and the plant will be unable to access oxygen; too little and the plant will lose the ability to transport nutrients, which are typically moved into the roots while in solution.

Two of the most common errors when growing are overwatering and underwatering. With the introduction of hydroponics, the two most common errors are eliminated. Hydroponics prevents underwatering from occurring by making large amounts of water available to the plant. Hydroponics prevents overwatering by draining away, recirculating, or actively aerating any unused water, thus, eliminating anoxic conditions.

Operating a hydroponic growspace today comes with a number of challenges that place significant burdens on farmers and leads to increased costs and/or inefficient food production. For example, current hydroponic systems have high manual labor costs for maintenance of crops. If farmers want to reduce labor costs, they can purchase traditional manufacturing equipment, which is very expensive. In addition, current hydroponic systems produce a lot of waste and have pest management problems. Last, current hydroponic systems do not have the ability to easily evolve because obtaining granular data can be taxing on farmers.

SUMMARY

The following presents a simplified summary of the disclosure in order to provide a basic understanding of certain embodiments of the present disclosure. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

Aspects of the present disclosure relates to a growspace automation system and method for growing plants using the growspace automation system. The system comprises a growspace and a mobile robot. The growspace includes one or more localization structures. The mobile robot includes one or more sensors, a mobility mechanism, a processor, memory; and a plurality of mobility modules. The plurality of mobility modules includes a localization module, a path planning module, and a motion control module.

In some embodiments, the plurality of mobility modules further includes a collision avoidance module. In some embodiments, the mobile robot is configured to transport a growing tray around the growspace. In some embodiments, the mobile robot is configured to facilitate engaging and disengaging of a growing tray from a plumbing connection. In some embodiments, the mobile robot is configured to capture data from grow trays as the mobile robot navigates around the growspace. In some embodiments, the mobile robot is configured to deliver nutrient water to grow trays in the growspace. In some embodiments, the mobile robot is configured to clean the growspace. In some embodiments, the mobile robot is configured to perform spray operations in the growspace. In some embodiments, the growspace includes a centralized processing area engineered specifically for processing growing trays. In some embodiments, the growspace includes a centralized sensing station configured to collect data from grow trays brought to the centralized sensing station by the mobile robot.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Figure 1:
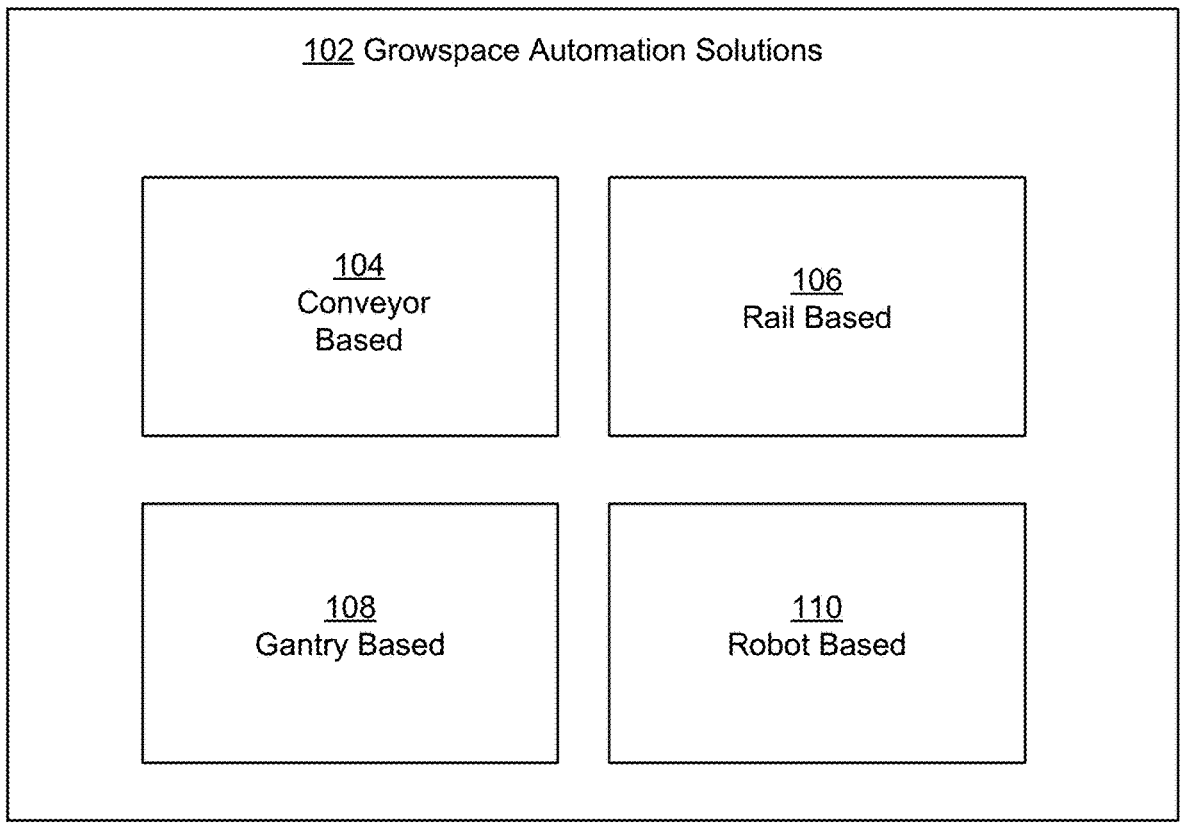
FIG. 1 illustrates a simple diagram showing one example of a typical growspace automation solution, in accordance with embodiments of the present disclosure.

Reference will now be made in detail to some specific examples of the present disclosure including the best modes contemplated by the inventors for carrying out the present disclosure. Examples of these specific embodiments are illustrated in the accompanying drawings. While the present disclosure is described in conjunction with these specific embodiments, it will be understood that it is not intended to limit the present disclosure to the described embodiments. On the contrary, it is intended to cover alternatives, modifications, and equivalents as may be included within the spirit and scope of the present disclosure as defined by the appended claims.

For example, portions of the techniques of the present disclosure will be described in the context of particular computerized systems. However, it should be noted that the techniques of the present disclosure apply to a wide variety of different computerized systems. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure.

Various techniques and mechanisms of the present disclosure will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

EXAMPLE EMBODIMENTS

As mentioned above, current hydroponic systems have many drawbacks. For example, labor costs are high (typically 60-80% of operating expenses) and reliability can be a problem at scale. It can be hard to find/retain good employees, maintain quality, and remain price competitive in an industry that often pays minimum wage or lower (e.g. migrant labor). This is especially true for growspaces that operate in urban areas with higher cost of living and minimum wage.

Another drawback can be capital expenditure. If growspaces want to reduce labor costs, they can look into automation. However, with current technology, automation to reduce labor costs is inflexible and capital intensive. Those growspaces that are automated use traditional process manufacturing techniques, e.g., conveyor belts, cart+rail, or raft systems that are expensive to install, crop specific (e.g. only work with lettuce or tomatoes, not both), and extremely difficult to reconfigure/move once put in place.

Yet another drawback is the lack of data. Getting good, granular data on crop production can be hard. Growspace farmers today struggle to answer questions like "How much labor went into this unit of produce (e.g. head of lettuce, single tomato, etc.)?", "What operations were applied to it and when? (e.g. pest control, pruning, transplanting)", "What is the unit cost of production for the produce we grow?" Traditional methods of tracking labor/materials often rely on immediate data entry that is challenging for farmers that are out in the field, wearing gloves, around lots of water, and unable to regularly interact with electronic devices like phones or computers while working.

The lack of data is often compounded by the slow rate of learning. Experimentation cycles are slow. When farmers want to experiment to improve production in growspaces today they are limited by their fixed infrastructure. Process improvements, tweaks to growing methods, and modifications to growing hardware are often impossible or prohibitively expensive because they imply retooling of the entire growspace. Often, farmers will wait until they build a new growspace to make changes based on learnings from their last operation which leads to improvement cycles that take years.

Yet another drawback is the management and suppression of pests and disease. Managing pests is a large part of running a growspace where preventative measures are always best. In addition, immediate reaction and response times can often be crucial. Rodents, aphids, mites, molds, etc. can present major problems in growspace settings if they cannot be kept in check.

Last, one other major drawback with current hydroponic systems is the inability to support diversification. Growspaces that have automation built into them are only capable of growing a small set of crops (often just one) that are aligned with the tooling they have. If a growspace growing lettuce loses a major customer, but finds a replacement that wants tomatoes instead, there is no easy way to switch. The cost of retooling and effort of reconfiguring a growspace prevents growers from making that kind of change. In addition, farmers cannot grow multiple crops or change what they grow based on the time of year or market patterns without changing automation systems. (e.g. Farmers cannot ramp up tomato production in the winter, but then swap it out for lettuce in the summer as field tomatoes flood the market).

The systems and techniques disclosed herein address the above mentioned issues by providing a growspace automation system using mobile robots. For example, in some embodiments, the disclosed automation systems are modular, requiring less up-front capital investment and allowing for gradual expansion of a grow operation. In some embodiments, the automation systems disclosed are decoupled from the crops being grown, which means that the techniques and systems work across many different crop types (e.g. lettuce, tomatoes, strawberries, etc.). In some embodiments, the automation systems disclosed are flexible and can be reconfigured on the fly, e.g., using mobile robots instead of conveyors means we can make changes to our farm in software rather than reconfiguring conveyors. In some embodiments, the automation systems disclosed allow for random access to plants. By contrast, conveyor and raft systems only allow farmers to access plants that are at the beginning or end of the conveyor or raft system. In such systems, if anything happens to plants in the middle (e.g., a disease) it's very difficult for growers to take action or even identify that the problem exists using traditional automation processes. In some embodiments, the automation systems disclosed allow for plant level tracking and data collection throughout the growth cycle with scheduling, monitoring, and management software vertically integrated into transport.

Some current hydroponic systems attempt to incorporate robotics into their growspaces. However, these robots are often large and custom built to move large tubs filled with water and crops around a farm. The systems and techniques disclosed provide significant advantages over these current systems. For example, in some embodiments, the growing method includes plumbing to continuously supply water and nutrients at a low flow rate. Current methods do not have such plumbing because all water and nutrients needed for the entire grow cycle are contained in the grow module, which is essentially a very large tub of water. In some embodiments, the robots disclosed herein are much smaller, thus reducing cost and increasing maneuverability, compared to the large, custom built robots that must be capable of lifting extremely heavy tubs of water. This allows for the grow systems disclosed, in some embodiments, to be small and light. In fact, in some embodiments, the grow systems disclosed are light enough even for rooftop growspaces, which have weight limits.

According to various embodiments, the growspace operating systems comprises a number of distinct components/modules/subsystems that operate together. However, it should be noted that techniques of the present disclosure do not require all components/modules/subsystems described. For example, in some embodiments, a growspace according to the present disclosure can include a single subsystem or any combination of the different subsystems described herein. The different components/modules/subsystems are described in detail below.

Current methods for automating growspaces only work for one type of plant, and cannot be reused across different crop types. Automated transport of a crop like lettuce provides a one-way movement of the crops through a raft or conveyor. Automated transport of a crop like tomatoes allows repeat visits of the same plant through rail/cart systems. This means that the overall cost of automation across different crop types is high, which makes automation unfeasible for some smaller market crops. In some embodiments, the techniques and mechanisms presented here decouple automation from crops that are grown (e.g. works for lettuce, tomatoes, peppers, cucumbers, etc.), allowing amortization of investment in automation/growing across a much larger market size and providing benefits for smaller crops (e.g. shiso, basil, eggplant, etc.). In some embodiments, the methods presented herein also allow for more flexible growing where mixtures of different crops can be grown using the same infrastructure (e.g. a greenhouse of tomatoes could be switched to a greenhouse of lettuce without re-tooling).

Current methods for automating growspaces also do not allow for detailed plant-level tracking, of which operations are applied throughout a plant life-cycle. As an example, a conveyor or rail/cart system does not collect data on labor, plant health, or identify pest pressure. In some embodiments, the robotic transport methods presented here automatically log each operation that occurs within a growspace and provide an easy way to collect data on plants/labor without installing expensive infrastructure.

Current transport systems such as conveyor transport systems are under-utilized, because plants do not move for most of their growth cycle, which means the transport system sits idle most of the time. To address this problem, in some embodiments, the systems disclosed herein separate the transport system into a mobility-only robot that runs at very high duty cycles. This means that the transport system never sits idle. Additionally, this means that many fewer moving parts are needed to build the transport system, since the transport system is shared across all grow spots in the farm, while current transport systems are dedicated to each grow spot in the farm.

Many controlled environment agriculture (CEA) growspaces rely on automation solutions to improve the efficiency and reliability of their operations. FIG. 1 outlines the four major growspace automation solutions 102 commonly deployed today: conveyor based 104, rail based 106, gantry based 108 and robot based 110 automation. Conveyor based automation 104 moves plants through a growspace using either mechanical conveyors or raft based systems where plants are floated in conveyor fashion on water and pushed. Rail based automation 106 systems leave the plants where they are and send automated carts into the growspace on rails to service them in place. Gantry based systems 108 rely on an overhead gantry that moves above the growspace and drops down to pick plants up and move them. Robot based systems 110 use mobile robots capable of navigating a growspace to pick up plants.

Conveyor based 104, rail based 106, and gantry based 108 systems all require large amounts of fixed infrastructure that is often expensive to be placed into a growspace. The size of this infrastructure increases linearly with the size of the growspace. As the square footage of a growspace goes up, so too does the cost of core automation systems. These types of systems are also inflexible making it difficult to meaningfully change how a growspace operates without expensive retrofitting or re-working of its underlying automation systems. Furthermore, such systems are often custom built for each growspace they occupy which increases complexity of deployment.

More recently, robot based 110 automation solutions have been deployed in the industry to attempt to reduce the cost and complexity of automation while increasing flexibility. While promising, current systems rely on localization solutions that are challenging to make robust. One common approach is to use a simultaneous localization and mapping (SLAM) solution to allow robots to keep track of where they are within a growspace. Another is to augment an existing growspace environment with markers or beacons placed in known locations that the robot can use as references for its own position. These approaches place few requirements on the structure of the growspace itself, often being added after the fact, which presents challenges in achieving robustness and accuracy. SLAM may fail or become inaccurate when an environment has repeating features or changes due to new objects or equipment being placed. And with markers or beacons, it is difficult to make strong guarantees about accuracy throughout the growspace with variabilities in coverage, visibility, and spacing. Often, failures are frequent enough that human operators are employed to help robots recover from localization failures increasing operational costs.

Figure 2:
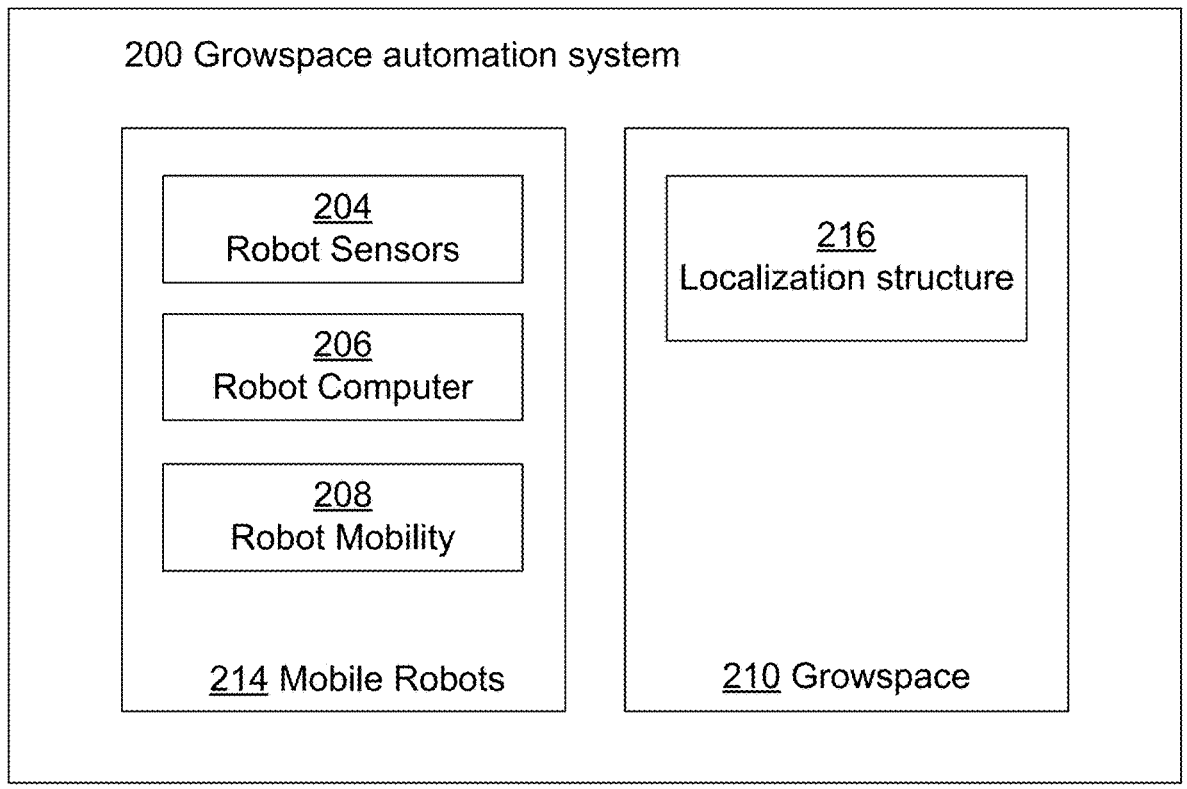
FIG. 2 illustrates a block diagram showing one example of a growspace automation system, in accordance with embodiments of the present disclosure.

FIG. 2 illustrates one example of a growspace automation system. FIG. 2 presents a mobile robot 214 based growspace automation system 200 that localizes off the structure of growspace 210 without the requirement for SLAM, added markers, or beacons. In some embodiments, growspace 210 is designed from the ground up to ensure that any structure or support that is within the field of view of robot sensors 204 is placed strategically to support localization efforts. The subset of growspace 210 that is within the field of view of robot sensors 204 represents localization structure 216 of growspace 210. To localize, robot sensors 204 send information about the world to robot computer 200 which compares this sensor information to a digital representation of the localization structure. By matching sensor readings with corresponding locations in localization structure 216, the robot can determine its position in the environment. From there, the robot computer computes desired commands to send to robot mobility mechanism 208 to move mobile robots 214 through growspace 210.

As localization structure 216 is designed with localization techniques in mind, it allows for less computationally intensive software to be used as compared to current techniques and also gives guarantees about accuracy and robustness of the system. In some embodiments, this removes the need for human operators, provides more accurate and consistent placement of items moved within growspace 210 by mobile robots 214. It also removes the need for any retrofitting after construction of growspace 210 is complete, as growspace 210 itself is localization structure 216.

Figure 3A:
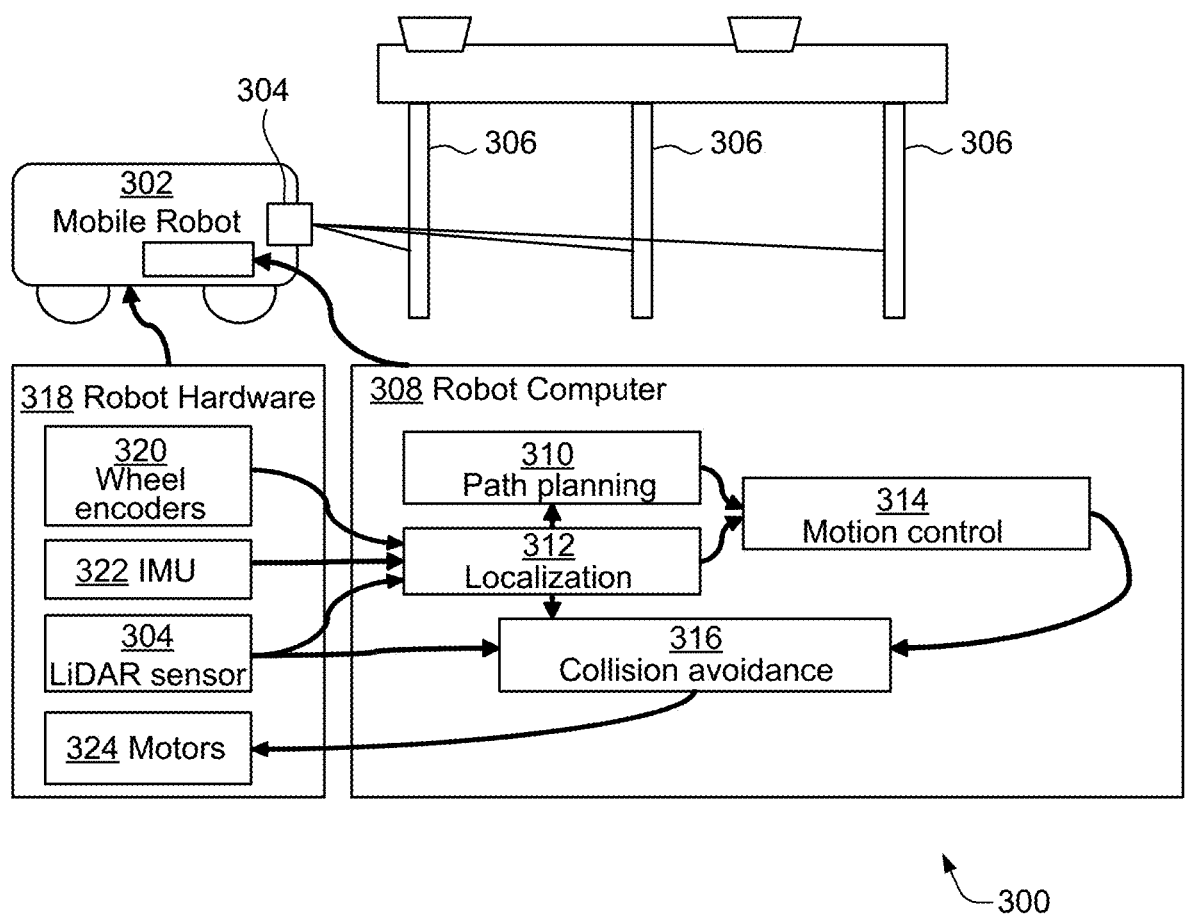
FIG. 3A illustrates an example growspace automation system, in accordance with embodiments of the present disclosure.

A specific implementation of this system is shown in FIG. 3A. FIG. 3A illustrates an example growspace automation system 300. System 300 includes a mobile robot 302 equipped with robot hardware 318, and robot computer 308. Robot hardware 318 includes a LiDAR sensor 304, wheel encoders 320, inertial measurement unit (IMU) 322, and motors 324. Robot hardware 302 is controlled by software running on the robot computer 308. The robot computer 308 contains four main software modules: localization 312, path planning 310, motion control 314, and collision avoidance 316. These modules work together to provide navigation capabilities that allow mobile robot 302 to move freely through the growspace.

In some embodiments, one of the core components upon which the navigation system is built is localization 312, as it provides vital information about the position of mobile robot 302 to other software modules. To determine its location within the growspace, mobile robot 302 uses LiDar sensor 304 to take information in about growspace 210 in the form of a scan containing distances and intensities of LiDAR hit points on objects in the horizontal plane of the sensor. Localization supports 306 are used throughout growspace 210 to encode points of interest in localization structure 216. The placement of localization supports 306 in growspace 210 is chosen to simplify the localization problem compared to traditional approaches that must deal with simultaneous localization and mapping, marker placement, or dynamic environments and ensures supports are spaced to allow easy data association to LiDAR hit points. Localization supports 306 are also spread throughout growspace 210 such that strong guarantees are made about visibility to them for LiDar sensor 304. At any location of mobile robot 302 in the growspace, LiDar sensor 304 is guaranteed to see at least two supports within two meters of distance that lie on separate LiDAR scan lines ensuring stability and accuracy for the localization system. This is shown in FIG. 3B, where localization supports 306 are visible for any location in the growspace that the robot may traverse represented by nodes 326 and edges 328 in a graph structure that spans the growspace.

To localize mobile robot 302, localization module 312 takes in data from wheel encoders 320 on the mobile robot that give an approximate measure of distance traveled along with information from IMU 322 that gives an estimate of the robot's orientation using a gyroscope. These two measures are fused together to compute an odometry estimate that is used as the starting point for an optimization process that works off LiDar sensor 304. To achieve this, hit points from scans produced by LiDar sensor 304 are matched with a digital representation of localization support 306 locations stored on robot computer 308 within localization module 312. First, a distance check is used to focus attention on likely location of localization supports 306 given the current location of mobile robot 302. Next, intensity filtering is performed on hit points to remove any that fall outside of the ranges known to be returned by localization supports 306 themselves. Finally, a modified gradient descent process starting from the best guess of the robot's current location given by the odometry computation described above is used to find a robot pose that minimizes the error of the sensor readings taken by LiDar sensor 304. Specifically, as localization supports 306 are cylindrical, the gradient descent process used for matching employs a cylindrical model that more accurately matches the shape of the scan in the physical environment and results in a more accurate prediction than a standard gradient descent process which would match points alone. The result of this optimization is the likely pose of mobile robot 302 within growspace 210. These steps lead to a stable, reliable, accurate, and computationally efficient localization process.

Figure 3B:
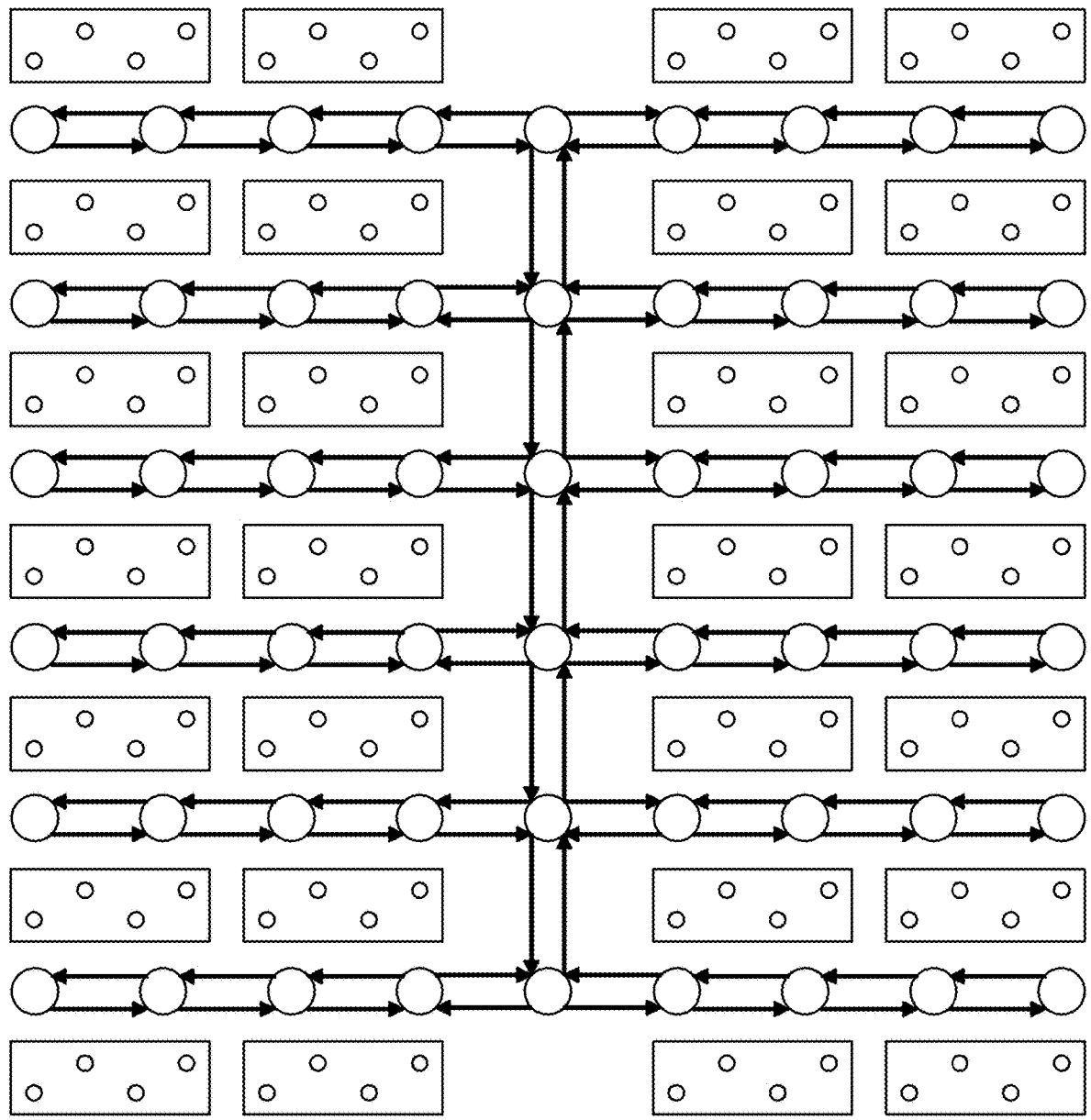
FIG. 3B illustrates an example graph based representation of a growspace, in accordance with embodiments of the present disclosure.

Once computed, the localization estimate is provided to path planning component 310, which holds a graph based representation of the growspace in which it can plan trajectories shown in FIG. 3B. FIG. 3B illustrates an example graph based representation of a growspace. Each node 326 in the graph represents a valid position for the robot and edges 328 represent motion primitives (chains of pre-computer accelerations and velocities) that connect valid positions to each other and have a cost associated with the distance traveled between nodes. This representation is sparse and leads to quick planning times where a plan from one part of the growspace to another can be represented as a graph search problem. To plan, the current location of the robot provided from localization module 312 is mapped to a node 326 in the graph as a starting point for planning and an end location is also selected and mapped to a node 326 in the graph. From there, the problem of planning is a search of the lowest cost path from start to end which is achieved via a modified AStar graph search. The modified AStar algorithm uses a standard heuristic of metric distance to determine the order in which to explore the graph, but is modified to support different footprints or configurations of the robot without requiring an additional graph. Specifically, traversability constraints are encoded in each edge 328 in the graph for different robot configurations and are evaluated during graph traversal. If a constraint is not satisfied, the modified AStar algorithm will treat the edge as non-traversable and attempt to find another path through the graph. The nodes and edges returned by this planner are then converted via a lookup from motion primitives into set points which contain positions and velocities that can be passed on to motion control module 314.

Figure 3C:
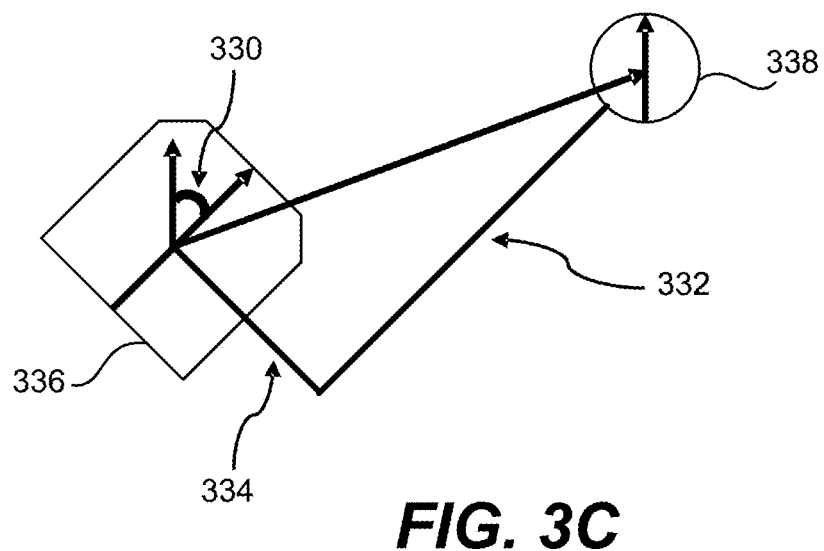
FIG. 3C illustrates an example trajectory of a mobile robot to a set point, in accordance with embodiments of the present disclosure.

Motion control module 314 is passed a trajectory of set poses containing desired positions and velocities for mobile robot 302 to achieve along with the latest estimate of the robot's position from localization module 312. To follow this trajectory, motion control module 314 employs three different proportional integral derivative (PID) controllers that compute the current error of robot 336 relative to a set point 338 on the trajectory as shown in FIG. 3C. FIG. 3C illustrates an example trajectory of a mobile robot to a set point. The controller computes error in the forward 332, sideways 334, and angular 330 directions from robot 336 to the closest set point 338. The PID responsible for forward error controls the linear velocity produced by the motion control system and the PIDs responsible for sideways and angular error are combined to produce a desired angular velocity command. As the robot moves past its current set point 338, a new one is selected from the trajectory and the process repeats.

Before sending velocity commands to the robot's motors 324, collision avoidance module 316 checks to ensure that they will not cause the robot to collide with anything in its environment. It does this by taking information from LiDar sensor 304 about obstacles sensed and forward simulating the robot's path based on its current trajectory and commands output by motion control module 314 along with its current location provided by localization module 312. If a collision is detected, collision avoidance module 316 will scale the velocity commands produced by motion control module 314 to ensure that the robot will stop before hitting the obstacle. Collision avoidance module 316 then sends desired velocities to motor controllers that move the robot's motors 324 based on that input.

According to various embodiments, this system configuration requires little computational power from robot computer 308, uses a LiDAR sensor 304 that is robust in all lighting conditions, as well as total darkness, and is cost effective in that localization support 306 can be readily made from any material that reflects light well. All this makes it cost effective, easy to deploy, and robust compared to robot based automation solutions that have been deployed in growspaces 210 to date which spend significant processing power building maps of their environment and/or processing markers in images. Furthermore, this system provides strong guarantees about its accuracy across the entire grow space as the localization supports 306 are designed in conjunction with localization software 312 which is another advantage over traditional systems whose accuracy often varies greatly in different parts of the environment.

Figure 4:
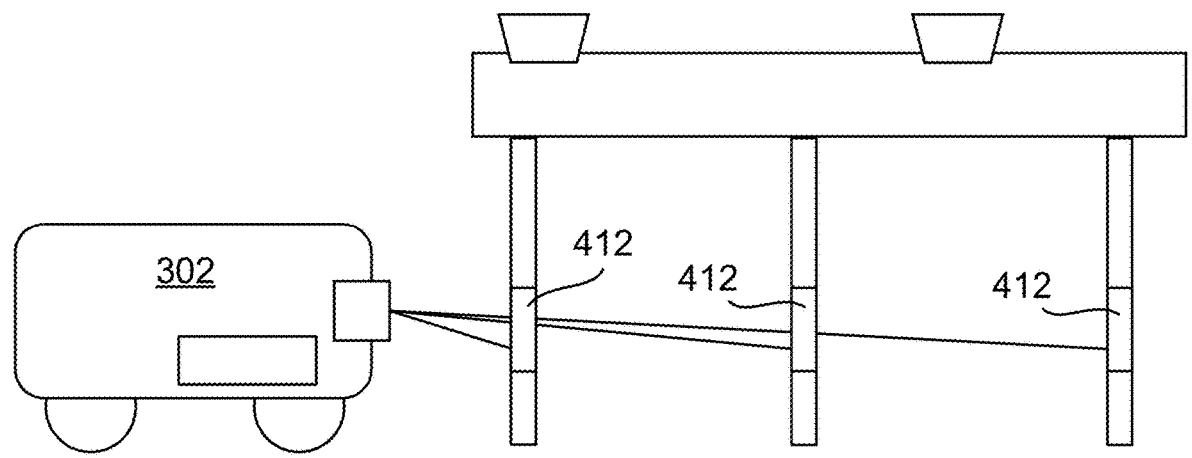
FIG. 4 illustrates an example grow system with localization, in accordance with embodiments of the present disclosure.

Some embodiments for robot localization and navigation within a growspace 210 uses a filtering process based on distance and intensities to determine whether a LiDAR hit point is likely to have fallen on a localization support 306. This is typically a robust process, but can struggle when objects enter a growspace and create hit points near localization supports 306 (e.g., when people walk close to a localization support 306). FIG. 4 shows an embodiment of the system that makes localization robust even in the presence of a wide range of dynamic objects. In this embodiment, reflectors 412 are placed around localization supports 306 that return light sent out by LiDar sensor 304 at known high intensity ranges. These reflectors 412 allow the intensity filtering process to be extremely restrictive, filtering out any LiDAR hit points that fall outside of the range returned by reflectors 412. With this in place, any outliers from dynamic objects that might have ended up being used for gradient descent are removed leading to a more robust localization process.

Figure 5A:
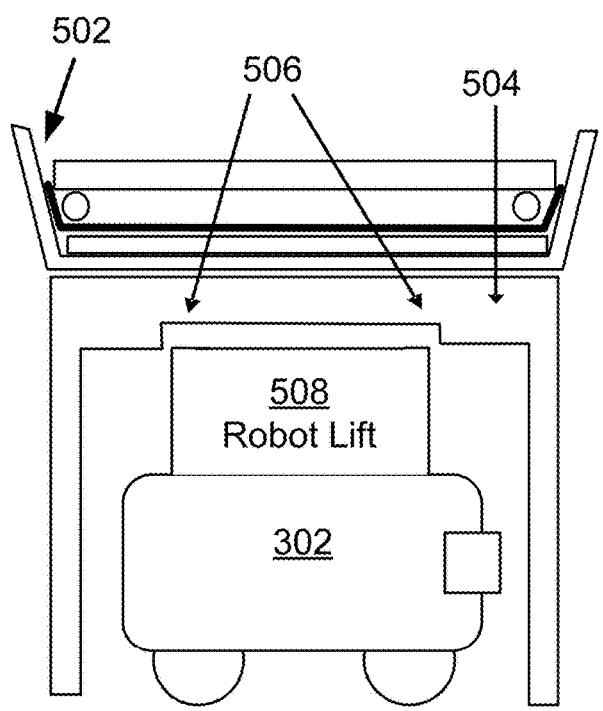
FIGS. 5A-5C illustrate examples of a grow system with mobile robot transport, in accordance with embodiments of the present disclosure.

According to various embodiments, tracking the position of a mobile robot 302 within a growspace 210 provides a foundation for automation, but does not inherently allow for the movement of plants within the environment. FIG. 5A shows an example of a system that enables a mobile robot 302 to move groups of plants around a growspace 210. In this embodiment, a robot lift 508 is attached to mobile robot 302. Robot lift 508 can travel up and down (e.g. using linear actuators) and connect to support lift connections 506 anywhere in the growspace. Once connected, mobile robot 302 can move anything sitting on top of support lift connection 506 through a growspace 210. Plants grown in growing trays 502 sit on top of growing tray supports 504 that incorporate support lift connections 506 into their design.

According to various embodiments, to move a growing tray 502 within growspace 210, mobile robot 302 positions itself under the support lift connection 506 associated with growing tray support 504 for the desired growing tray 502. Robot lift 508 then lifts growing tray support 504 off the ground by pushing up on support lift connection 506. Once robot lift 508 is in its extended position, growing tray 502 is effectively attached to mobile robot 302 and ready for transport. Mobile robot 302 can then navigate to another point in growspace 210. Once there, robot lift 508 moves down, placing growing tray support 504 back onto the ground and completing the transport operation.

The embodiment described in the section above provides a mechanism for a mobile robot 302 to move a growing tray 502 throughout a growspace 210 in an automated fashion. However, it can be challenging to meet high accuracy requirements for growing tray 502 placement as robot lift 508 will place growing tray 502 with a maximum error equivalent to that of the tolerance of support lift connection 506. In some embodiments, making support lift connection 506 large can lead to a case where growing tray 502 is positioned inaccurately, e.g., if there is any error in growing tray 502 pickup either from localization, mobile robot control, or movement of support lift connection 402 while robot lift 508 is extending.

Figure 5B:
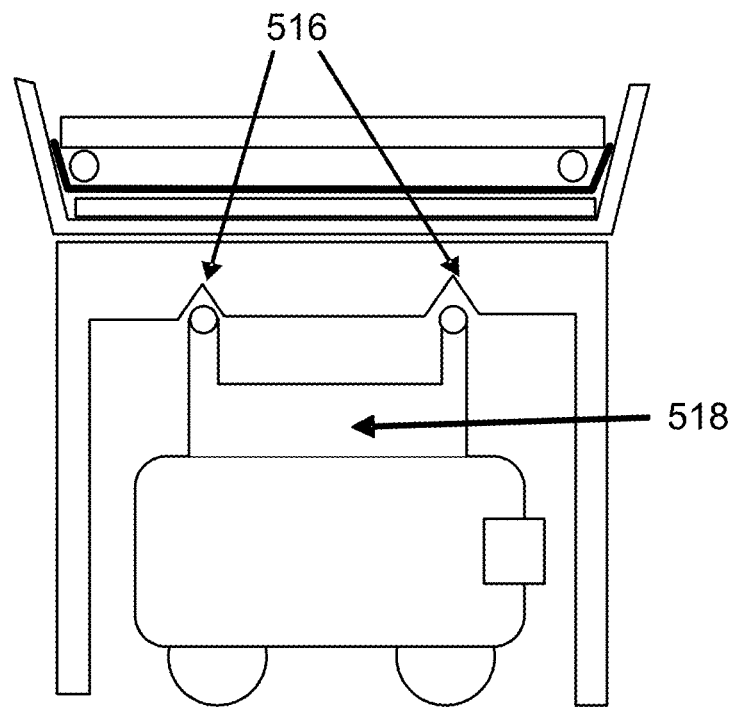

In some embodiments, to ensure accurate placement of growing trays 502 and to remove any error caused from the lift process itself a different kind of lift mechanism may be employed. FIG. 5B illustrates a system that uses a self-aligning lift 518 to attach to a self-aligning connection 516 during pickup and dropoff operations. Self-aligning connections 516 are shaped so that they use gravity to mechanically align with self-aligning lift 518 when picked up. Specifically, self-aligning connections 516 are shaped such that they will slide along self-aligning lift 518 to guarantee centering when self-aligning lift 518 is fully extended. By using multiple alignment connections 516 placed at different angles, growing tray 502 will align itself with lift 518 in all six degrees of freedom of a rigid body. This embodiment of the system leads to more accurate placement of growing trays 502 in that self-alignment guarantees no error occurs from the lift process. Growing trays 502 are placed at the raw accuracy of the localization system.

The embodiment presented in the section above provides a mechanism to mechanically align a growing tray 502 with a self-aligning lift 518, but requires a separate growing tray support 504 and self-aligning connection 516 as additional components. This increases the expense of the system as well as the complexity of construction and deployment. To reduce costs and complexity of lifting growing trays 502, it may be desirable to reduce the number of components required to make the system work.

Figure 5C:
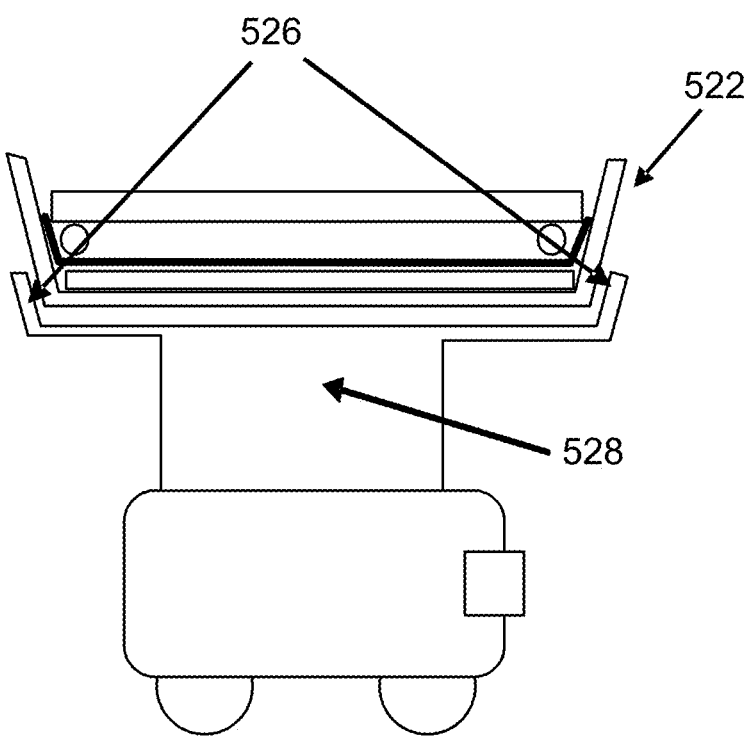

The example embodiment shown in FIG. 5C reduces cost and complexity of the process of lifting a growing tray 502 by placing a self-aligning connection 526 on a self-aligning lift 528 directly rather than on a supporting structure. Self-aligning connection 526 shown in FIG. 5C is angled and relies on growing tray slope 522 along with gravity to ensure that growing tray 502 becomes centered on self-aligning lift 528. Specifically, as self-aligning lift 528 extends, growing tray 502 slides down the sides of self-aligning connection 526 to a desired and repeatable position. This configuration reduces costs of materials, simplifies the number of components, and produces a system that meets high accuracy requirements that come with transport.

Figure 6:
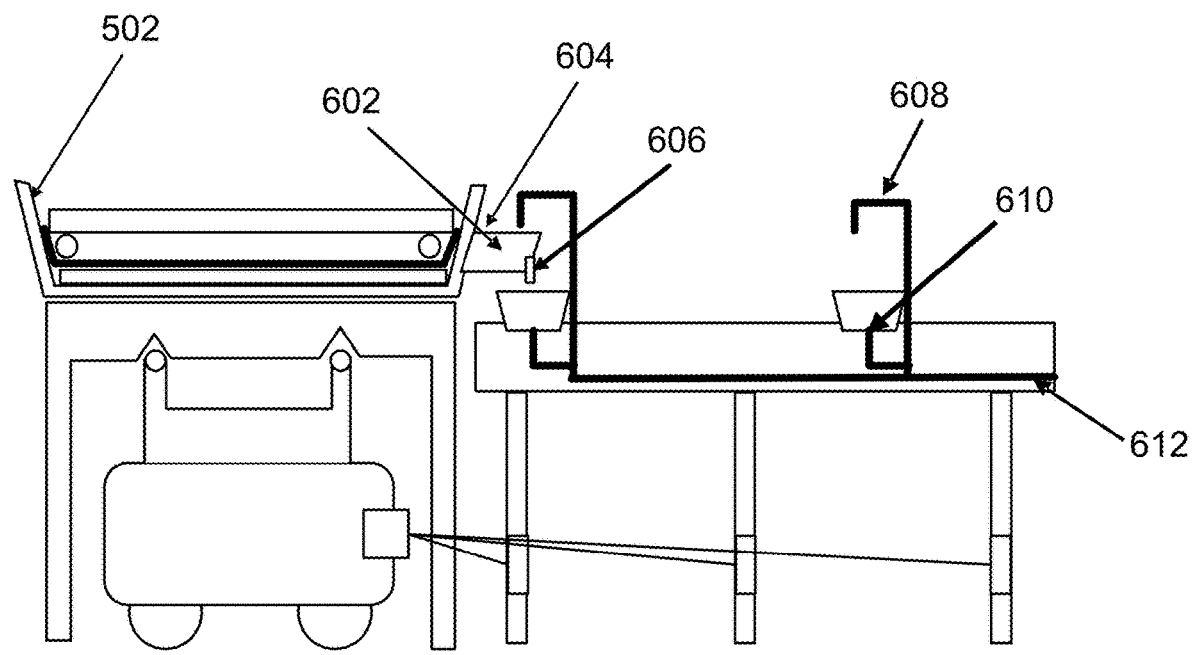
FIG. 6 illustrates a grow system with a passive plumbing connection, in accordance with embodiments of the present disclosure.

According to various embodiments, growing plants often requires plumbing infrastructure to provide water and nutrients. Transporting plants in the presence of such infrastructure with mobile robots 302 can be challenging and requires that careful thought be given to insertion and removal to avoid splashing or leaks. FIG. 6 illustrates a grow system with a passive plumbing connection. FIG. 6 shows a passive approach to interface with plumbing that requires no mechanical couplings, is inexpensive to implement, and highly reliable when paired with transport via mobile robots 302.

In FIG. 6, growing tray plumbing 602 is added to growing tray 502 where a growing tray inflow 604 and growing tray outflow 606 take nutrient water into the tray and allow for water to drain out. Growing tray plumbing 602 is positioned in such a way that nutrient water can flow into it from growspace plumbing 612 via growspace plumbing outflow 608 and drain out of it to growspace plumbing 612 via growspace plumbing inflow 610. Enough clearance is left between growing tray plumbing 602 and growspace plumbing outflow 608 that when robot lift 508 is extended the growing tray plumbing 602 does not hit growspace plumbing outflow 608. Thus, the passive plumbing connection in FIG. 6 can be considered a water flow alignment, rather than a physical connection.

According to various embodiments, to move a growing tray 502 that is connected to plumbing, the mobile robot simply lifts it up, tilts the growing tray slightly away from growing tray outflow 606 to avoid any water sloshing out growing tray outflow 606 during transport, and backs growing tray 502 out of its plumbing connection. According to various embodiments, to insert growing tray 502 back into plumbing, the opposite process is followed where mobile robot 302 positions growing tray 502 so that growing tray plumbing 602 sits under the growspace plumbing outflow 608, reverses the tilt of growing tray 502 to be level, and lowers robot lift 508 to fix growing tray 502 in place.

Figure 7A:
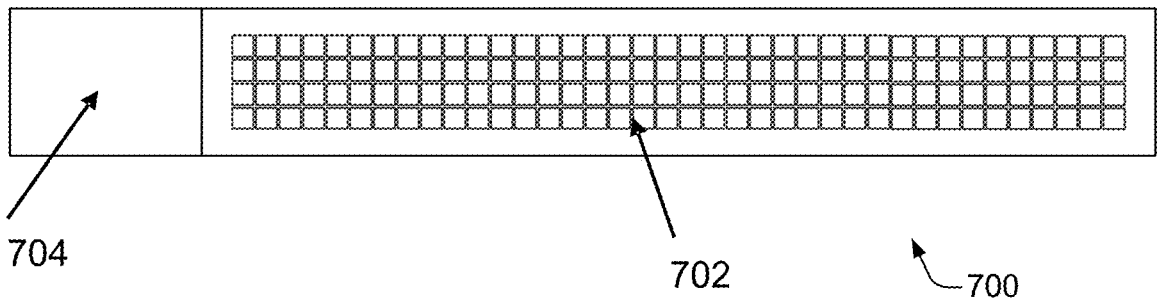
FIGS. 7A-7C show examples of a growspace with a central processing area, in accordance with embodiments of the present disclosure.

According to various embodiments, there are a number of advantages to limiting the amount of human processing and interaction with plants that is done in the growspace. Humans are the most likely vector for pests and contamination and often struggle with challenging ergonomics that come along with performing tasks in an environment engineered for the growing of plants, not for the associated labor that comes with managing them. To address these issues, the example growspaces 700 illustrated in FIGS. 7A-7C use mobile robots 302 to move growing trays 502 out of a growing area 702 into a central processing area 704 that is separate and engineered specifically for processing of growing trays 502. In some embodiments, this configuration allows for central processing area 704 to be outfitted with specialized equipment to assist in common tasks (e.g. harvesting, transplanting) and to make ergonomics favorable for any human labor that must be performed.

According to various embodiments, controlling pests in a growspace is an important activity that employs both passive and active methods. For passive methods, the growspace is sealed off as much as possible from pests with screens or other barriers. For active methods, pesticides are applied actively to plants in a growspace in order to combat the establishment of pest communities that manage to bypass the passive barriers that are in place. To this point, active management strategies require either automated but large scale application strategies (e.g. growspace wide foggers that spray pesticide) or small scale, but human operated application strategies (e.g. a person with a backpack spraying pesticides) that can be applied in a more targeted fashion. Large scale application has the disadvantage of using more pesticides than needed which can be bad for workers as well as the environment. However, targeted applications often require humans to be in hazardous conditions requiring respiratory protection and are also labor intensive.

Figure 7B:
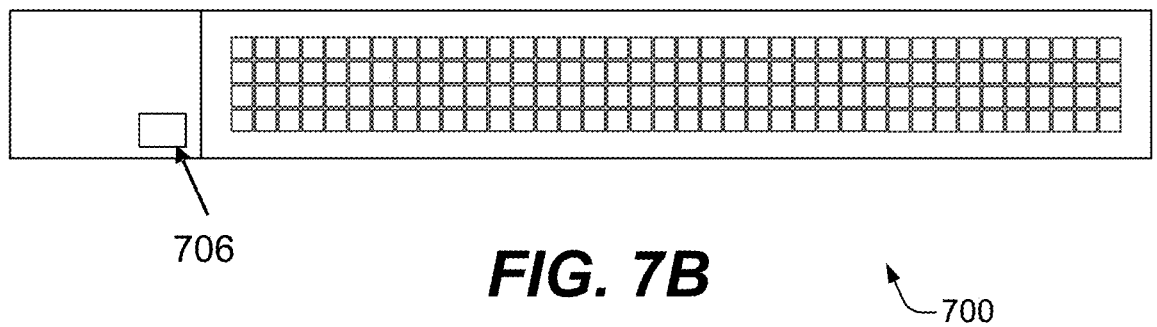

FIG. 7B presents an embodiment of system 700, in which pest control is performed in an automated fashion by mobile robots while still allowing for targeted action to be taken. In this system, growing trays 502 are moved by mobile robots 302 to a designated pest control area 706. Pest control area 706 can be separate from main growing area 702, while being well sealed, well ventilated, and capable of applying pesticides to a small subset of the plants in the full growspace 210. This protects human workers while still giving the advantages that come along with the ability to be prescriptive in pesticide use.

According to various embodiments, high quality and regular data collection is fast becoming an important part of controlled environment agriculture operations. However, collection of this data is often challenging requiring the deployment of expensive sensors (e.g. multispectral imagers, 3D cameras) throughout a large growspace. Not only are the sensors themselves costly to purchase and maintain, but they often require electrical connectivity, calibration, high bandwidth network connections, and other fixed infrastructure to be effective. Furthermore, the quality of the data these sensors produce can be affected by differences in environmental factors in the growspace (e.g. differences in lighting) making it difficult to compare readings from sensors located in different locations.

Figure 7C:
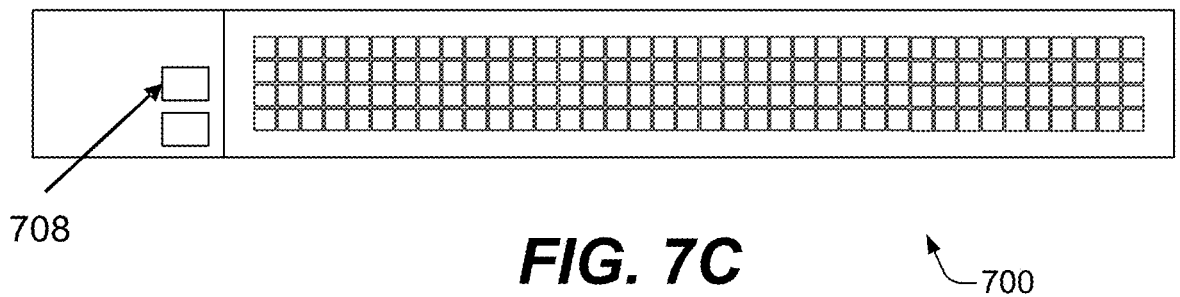

FIG. 7C presents an embodiment of system 700 that solves this problem by moving plants in growing trays 502 to a central sensing station 708 with mobile robots 302. This sensing station 708 can control environmental factors like lighting and ensure all data is collected in a uniform environment with a consistent suite of sensors. Centralizing sensing also reduces the cost of sensing for a growspace as less instances of a given sensor are required.

In some embodiments, for some high frequency sensing tasks, bringing growing trays 502 to a central sensing station 708 may be prohibitively expensive in terms of the time it takes a mobile robot 302 to accomplish the transportation. For such tasks, it may be desirable to sense directly in growspace 210 instead of at central sensing station 708. However, it may also be desirable to avoid the cost and complexity that comes with deploying a wide range of sensors throughout growspace 210 to ensure adequate coverage.

Figure 8:
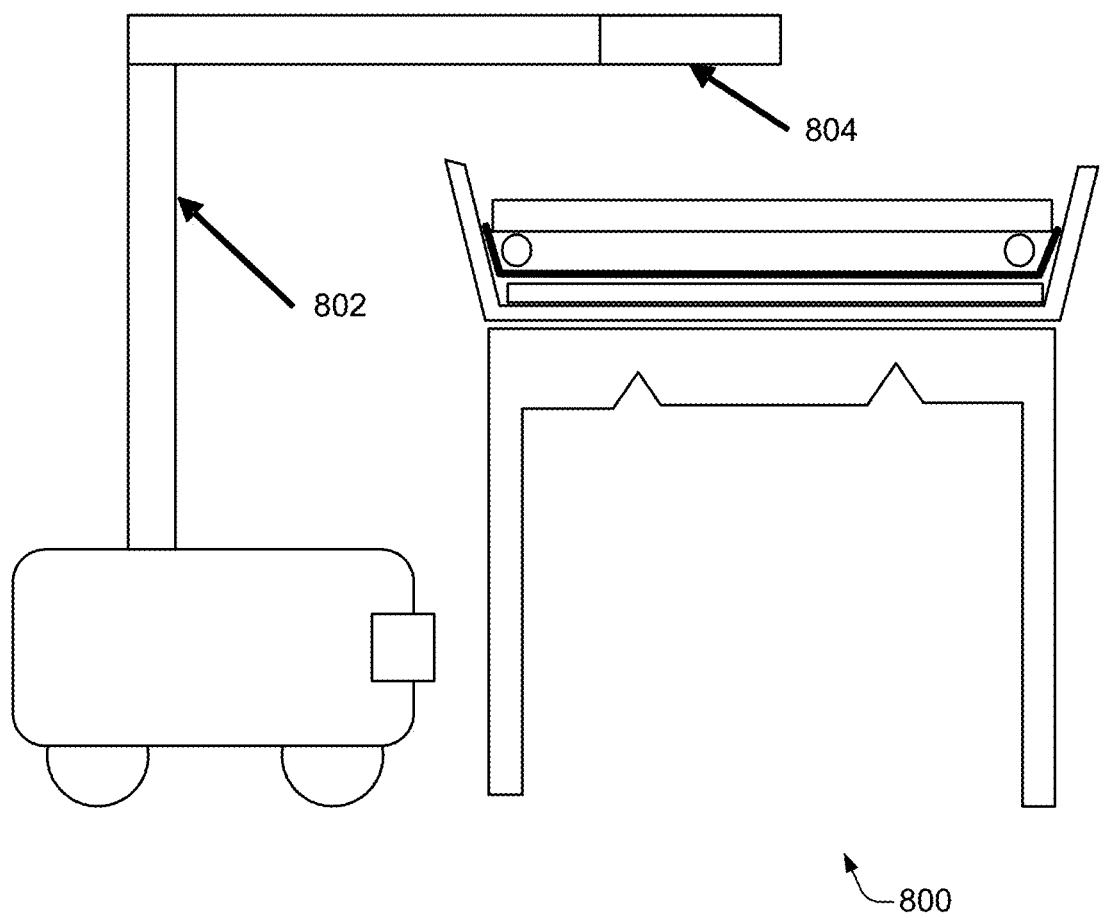
FIG. 8 illustrates an example grow system with robot centric sensing, in accordance with embodiments of the present disclosure.

FIG. 8 presents an example grow system with robot centric sensing. System 800 includes a sensor fixture 802 attached to a mobile robot 302 that navigates a growspace 210 filled with growing trays 502. As mobile robot 302 drives through growspace 210, it captures data of growing trays 502 with a sensor suite 804 mounted to sensor fixture 806. This allows mobile robot 302 to collect large scale data without having to move any growing trays 502, thereby greatly reducing the time required for collection as compared to a central sensing approach. This embodiment maintains the advantage of requiring a much smaller number of sensors as compared to growspace wide sensor deployments and allows for optimal control and placement of sensor suite 804 relative to a growing tray 502.

According to various embodiments, most growspaces use pipes to move nutrient water from one place to another. However, pipes can be expensive to install and maintain and they are relatively inflexible. Moreover, when wishing to deliver many types of nutrient mixes to different areas of growspace 210, a dedicated pipe to each area of growspace 210 is required, dramatically increasing the number of pipes required. The low water requirements for hydroponics allows for piping to be drastically reduced or even eliminated by transporting water with mobile robots 302.

Figure 9A:
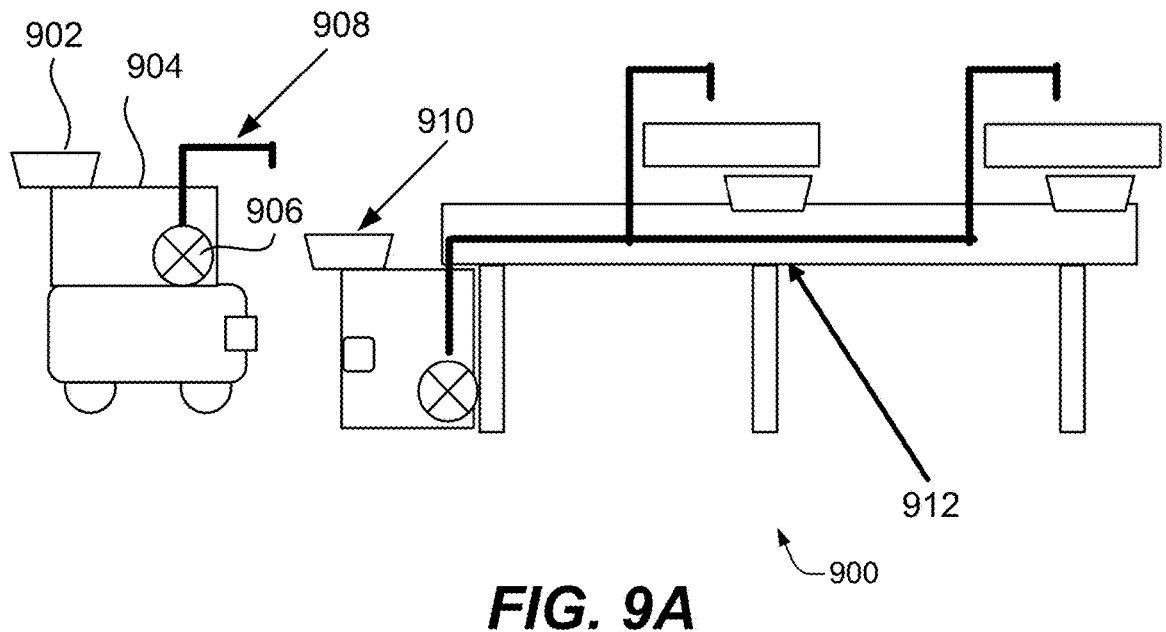
FIGS. 9A-9B illustrate examples of a grow system with mobile robot watering, in accordance with embodiments of the present disclosure.
Figure 9B:
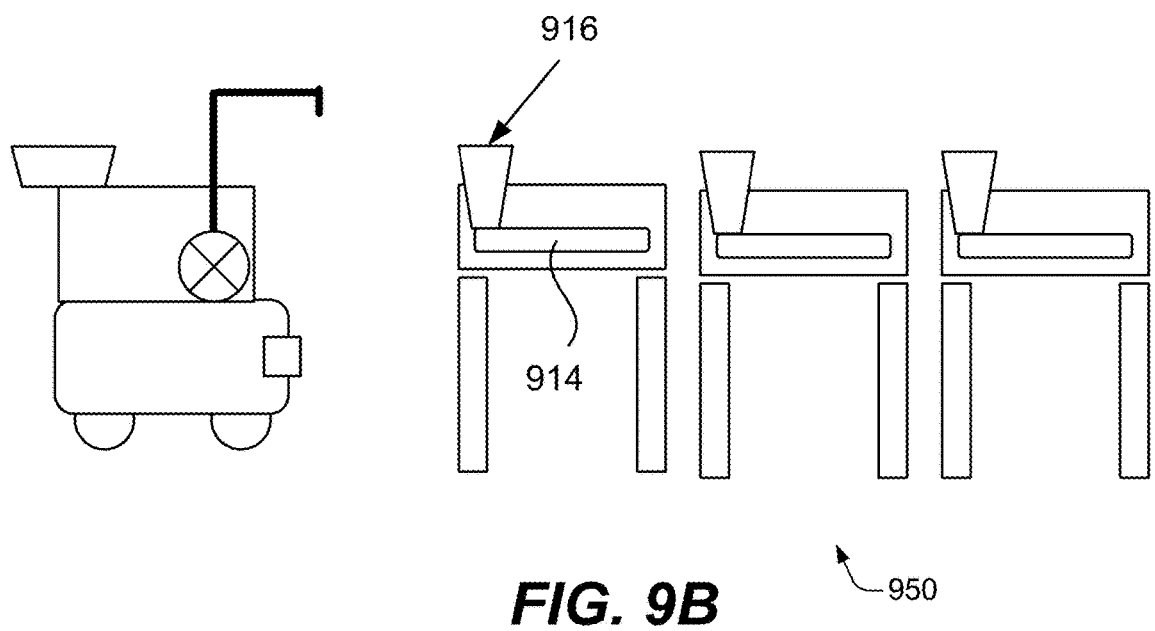

FIGS. 9A-9B illustrate examples of a grow system with mobile robot watering. FIG. 9A presents an embodiment of a system 900 that uses mobile robots 302 to deliver nutrient water to docks 912 of local plumbing systems connected to growing trays 502. System 900 eliminates the need for growspace wide piping systems and instead places a robot reservoir 904 on mobile robot 302 that holds nutrient water during transport throughout the growspace. The nutrient water comes into robot reservoir 904 via the robot inflow 902. Mobile robot 302 drives to a desired dock 912 and uses robot pump 906 to move water out of robot outflow 908 and into dock inflow 910. This system is flexible enough to deliver different nutrient mixes to each dock 912 within a growspace and drastically reduces the amount of plumbing required in a growspace.

According to various embodiments, tt may be desirable to go even further in the elimination of plumbing and to do away with the concept of even a dock 912 altogether. FIG. 9B presents an example system 950 in which mobile robot 302 delivers nutrient water to growing trays 502 directly. In system 950, each growing tray 502 has a growing tray reservoir 914 that stores nutrient water for the tray. A mobile robot 302 can navigate to a given growing tray 502 and use robot pump 906 to move water into growing tray inflow 916. In some embodiments, system 950 eliminates all plumbing in a growspace which greatly reduces cost and complexity of deployment and operation.

According to various embodiments, one regular though often overlooked component of operating a growspace is a cleaning process. Cleaning reduces the risk of pests and contamination of products and is required by many regulators in order to be certified to operate a growspace. Today, cleaning is also a highly manual operation where human operators hose down and sweep the growspace periodically. This makes it an expensive, time consuming, and error prone process.

Figure 10:
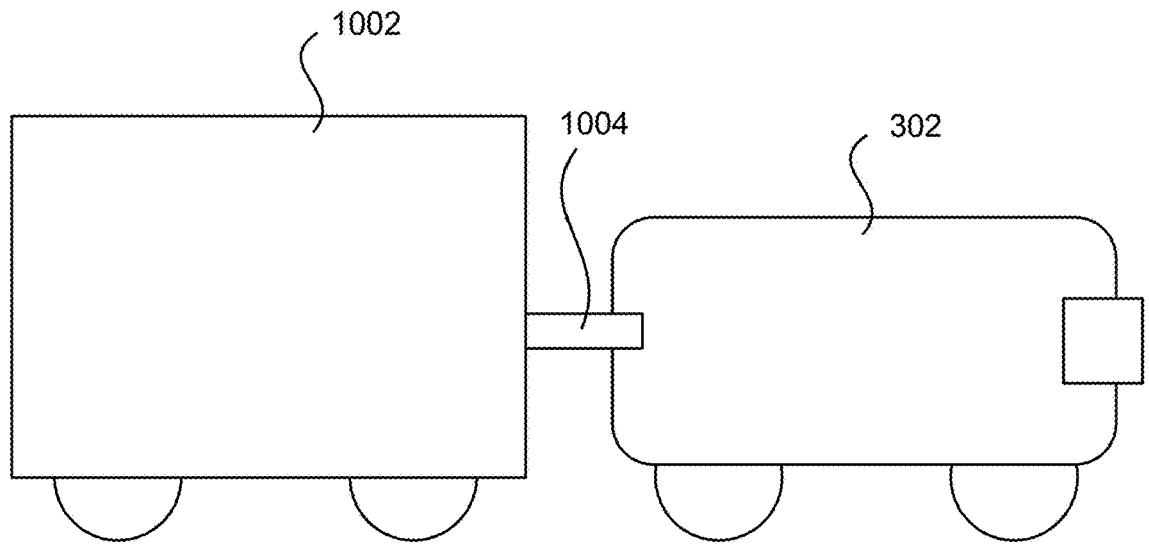
FIG. 10 illustrates an example of a mobile robot configured to clean a growspace, in accordance with embodiments of the present disclosure.

FIG. 10 illustrates an example of a mobile robot configured to clean a growspace. A cleaning attachment 1002 is connected to mobile robot 302 via an attachment hitch 1004 and towed throughout the growspace cleaning as it goes. This removes the need for human labor to be involved in the cleaning process and allows for strong guarantees to be made about the quality of cleaning that is done. By reducing the cost of cleaning, it also makes it possible to clean a growspace more often thereby improving the effectiveness of the process and reducing risk of pests or contamination.

Figure 11:
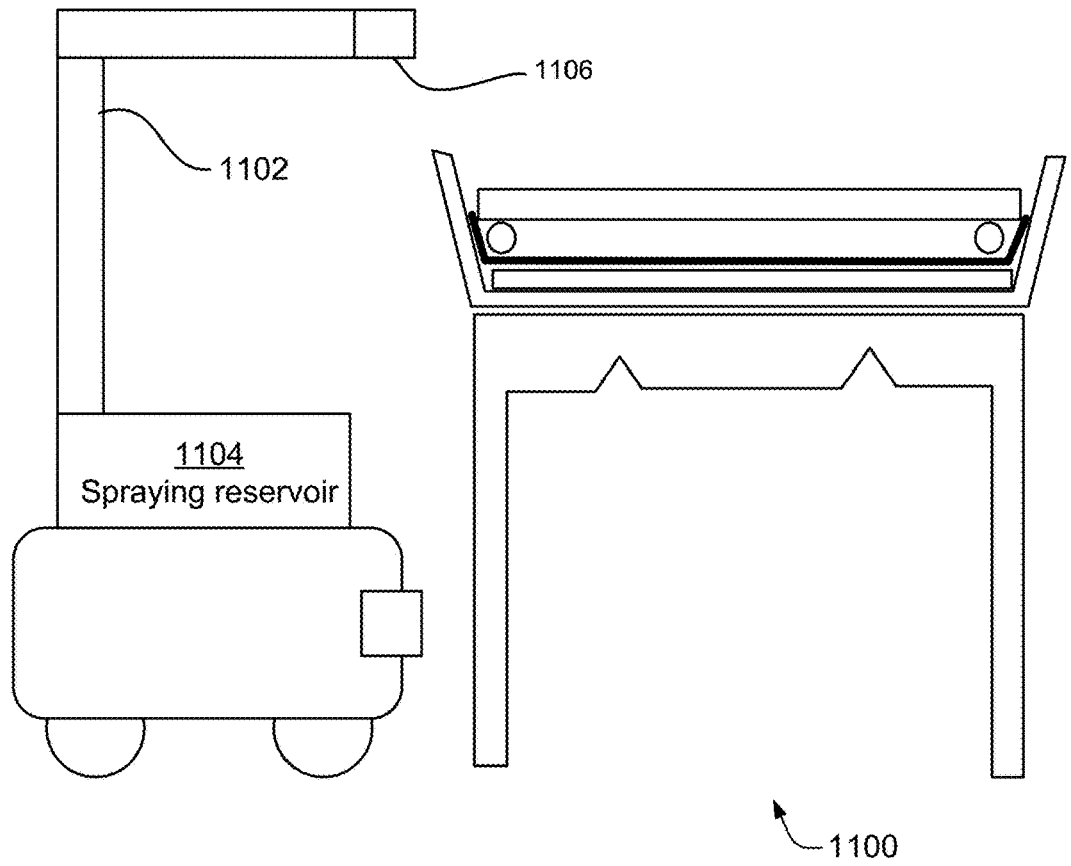
FIG. 11 illustrates an example of a mobile robot configured to perform spray operations in a growspace, in accordance with embodiments of the present disclosure.

FIG. 7B described solutions for pest control that bring growing trays 502 to a central pest control area 706 to avoid having to spray the entire growspace 210 with a fogging system or have humans engage in more targeted operations. In some situations where a large percentage of the growspace requires treatment, it may be prohibitive to bring all growing trays 502 to a central area from a robot time perspective. FIG. 11 illustrates an example of a mobile robot configured to perform spray operations in a growspace.

FIG. 11 presents an embodiment of the present disclosure that allows for mobile robots 302 to perform pest control or other spraying operations in growspace 210 in an automated fashion that is efficient and requires no human input. System 1100 adds a spraying fixture 1102 to the robot along with a spraying reservoir 1104. As mobile robot 302 drives through growspace 210, the sprayer 1106 can pull from the spraying reservoir 1104 to spray a desired substance at a particular location. This mechanism can be used to do targeted, growing tray 502 level deployment of pesticides, $CO_2$, or other materials without requiring transport of growing trays 502 to a central location.

The examples described above present various features that can be included in a mobile robot configured to operate in a growspace. However, embodiments of the present disclosure can include all of, or various combinations of, each of the features described in FIGS. 2-11. Various embodiments of the present disclosure involve mobile robots. In some embodiments, mobile robots include hardware and software, similar to a computer. In some embodiments, mobile robots include a computer system configured to perform the functions described above.

Figure 12:
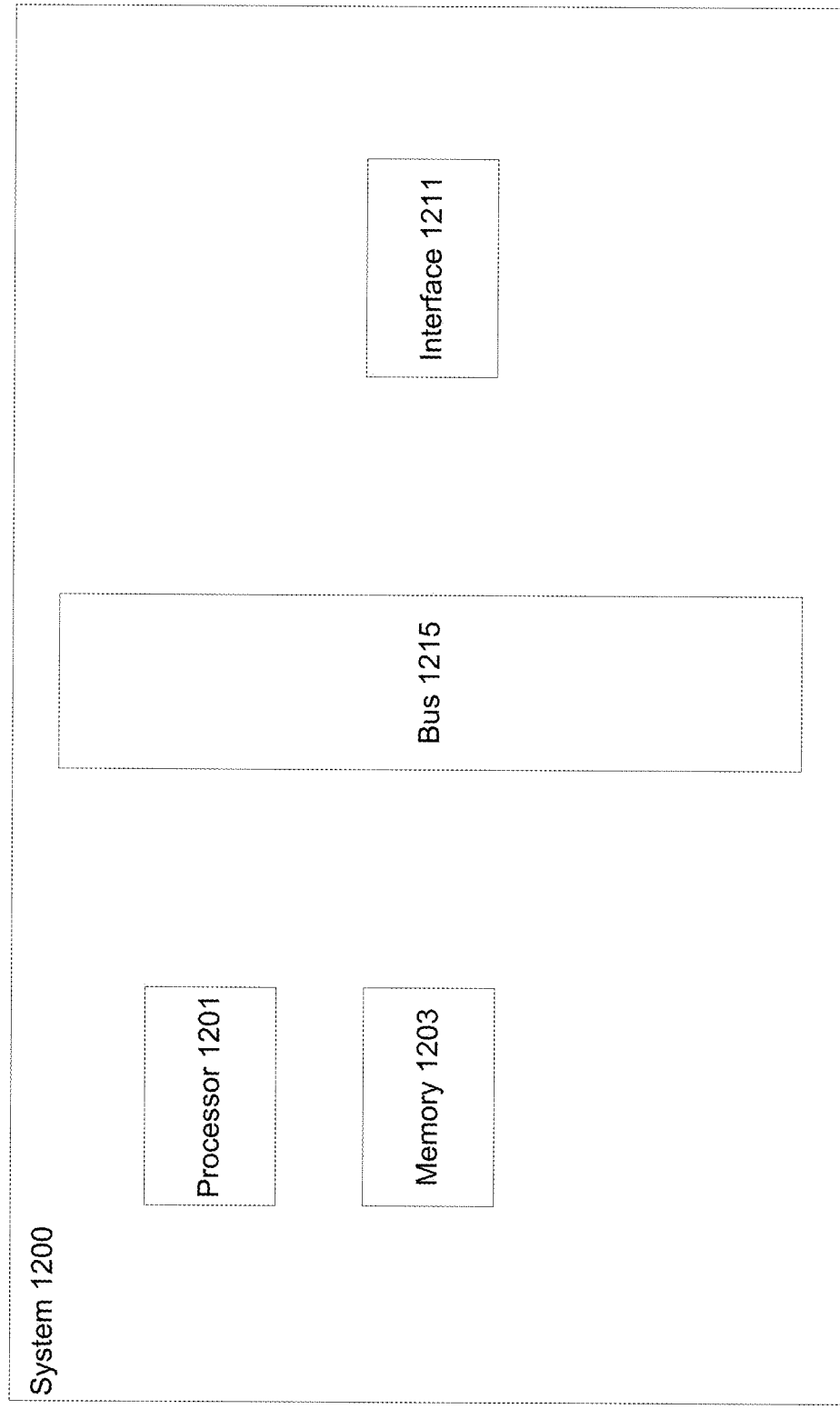
FIG. 12 illustrates an example of a computer system, configured in accordance with one or more embodiments.

FIG. 12 illustrates one example of a computer system, in accordance with embodiments of the present disclosure. According to particular embodiments, a system 1200 suitable for implementing particular embodiments of the present disclosure includes a processor 1201, a memory 1203, an interface 1211, and a bus 1215 (e.g., a PCI bus or other interconnection fabric). When acting under the control of appropriate software or firmware, the processor 1201 is responsible for implementing applications such as an operating system kernel, a containerized storage driver, and one or more applications. Various specially configured devices can also be used in place of a processor 1201 or in addition to processor 1201. The interface 1211 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HS SI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 1200 is a computer system configured to run a growspace automation system, as shown herein. In some implementations, one or more of the computer components may be virtualized. For example, a physical server may be configured in a localized or cloud environment. The physical server may implement one or more virtual server environments in which the growspace automation is executed. Although a particular computer system is described, it should be recognized that a variety of alternative configurations are possible. For example, the modules may be implemented on another device connected to the computer system.

In the foregoing specification, the present disclosure has been described with reference to specific embodiments.

However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of present disclosure.

What is claimed is:

1. A growspace automation system, the system comprising:
   a growspace that includes one or more localization structures that physically support one or more growing trays; and
   a mobile robot, wherein the mobile robot comprises:
   one or more sensors;
   a mobility mechanism;
   a processor; and
   memory, wherein the processor determines a positioning of the mobile robot using the one or more localization structures that physically support the one or more growing trays.

2. The system of claim 1, wherein the processor is further configured to generate one or more velocity commands to motors of the mobile robot, wherein the velocity commands are configured to avoid a collision for the mobile robot.

3. The system of claim 1, wherein the mobile robot is configured to transport a growing tray around the growspace.

4. The system of claim 1, wherein the mobile robot is configured to facilitate engaging and disengaging of a growing tray from a plumbing connection.

5. The system of claim 1, wherein the mobile robot is configured to capture data from growing trays as the mobile robot navigates around the growspace.

6. The system of claim 1, wherein the mobile robot is configured to deliver nutrient water to growing trays in the growspace.

7. The system of claim 1, wherein the mobile robot is configured to clean the growspace.

8. The system of claim 1, wherein the mobile robot is configured to perform spray operations in the growspace.

9. The system of claim 1, wherein the growspace includes a centralized processing area engineered specifically for processing growing trays.

10. The system of claim 1, wherein the growspace includes a centralized sensing station configured to collect data from growing trays brought to the centralized sensing station by the mobile robot.

11. A method for growing plants, the method comprising:
    growing plants in a growspace that includes one or more localization structures that physically support one or more growing trays; and
    automating growspace processes using a mobile robot, wherein the mobile robot comprises:
    one or more sensors;
    a mobility mechanism;
    a processor; and
    memory, wherein the processor determines a positioning of the mobile robot using the one or more localization structures that physically support the one or more growing trays.

12. The method of claim 11, wherein the processor is further configured to generate one or more velocity commands to motors of the mobile robot, wherein the velocity commands are configured to avoid a collision for the mobile robot.

13. The method of claim 11, wherein the mobile robot is configured to transport a growing tray around the growspace.

14. The method of claim 11, wherein the mobile robot is configured to facilitate engaging and disengaging of a growing tray from a plumbing connection.

15. The method of claim 11, wherein the mobile robot is configured to capture data from growing trays as the mobile robot navigates around the growspace.

16. The method of claim 11, wherein the mobile robot is configured to deliver nutrient water to growing trays in the growspace.

17. The method of claim 11, wherein the mobile robot is configured to clean the growspace.

18. The method of claim 11, wherein the mobile robot is configured to perform spray operations in the growspace.

19. The method of claim 11, wherein the growspace includes a centralized processing area engineered specifically for processing growing trays.

20. The method of claim 11, wherein the growspace includes a centralized sensing station configured to collect data from growing trays brought to the centralized sensing station by the mobile robot.

* * * * *